July 11, 1944.  R. J. STEWART ET AL  2,353,277
FLOAT VALVE FOR FILLING MACHINE RESERVOIRS
Filed June 29, 1939  2 Sheets-Sheet 1
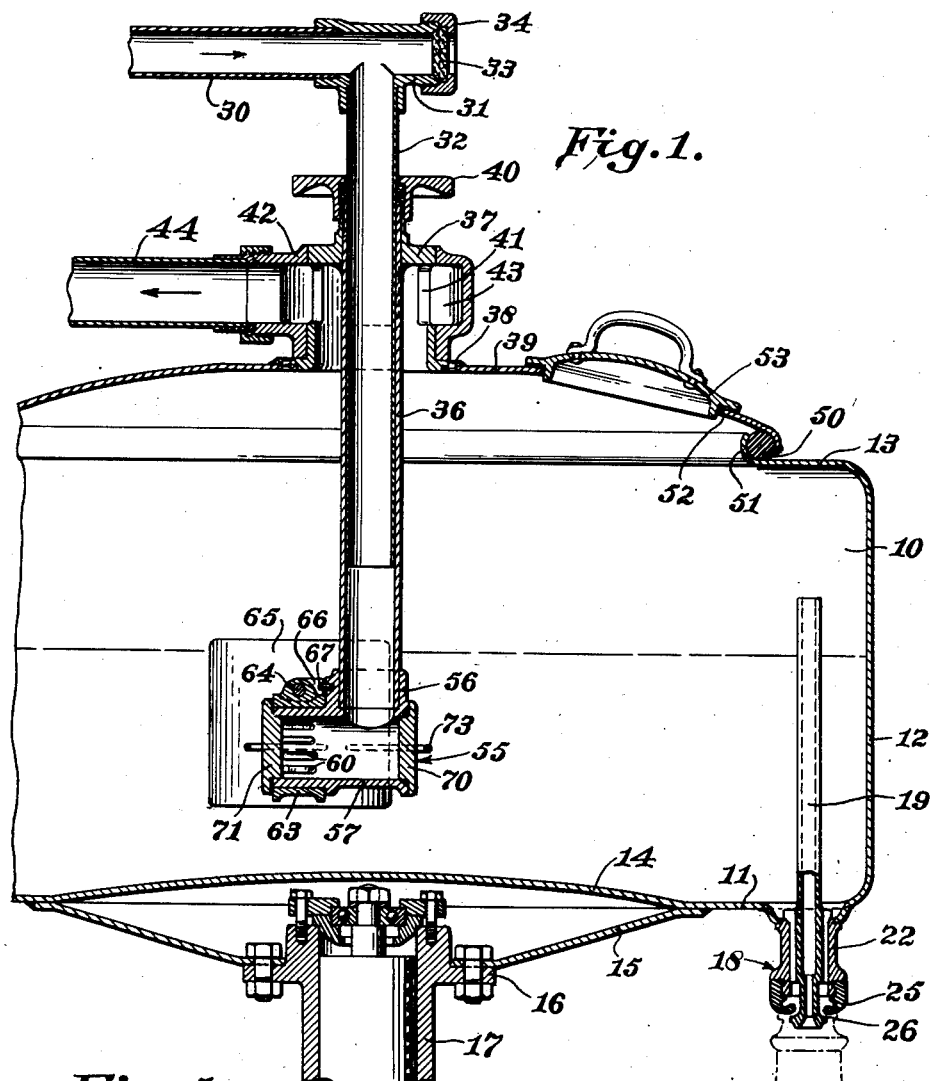
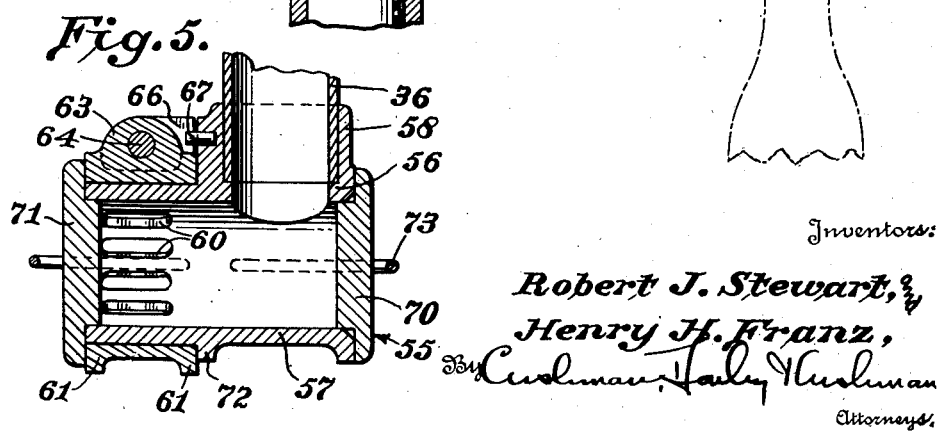
Inventors:
Robert J. Stewart,
Henry H. Franz, July 11, 1944.   R. J. STEWART ET AL   2,353,277
FLOAT VALVE FOR FILLING MACHINE RESERVOIRS
Filed June 29, 1939   2 Sheets-Sheet 2
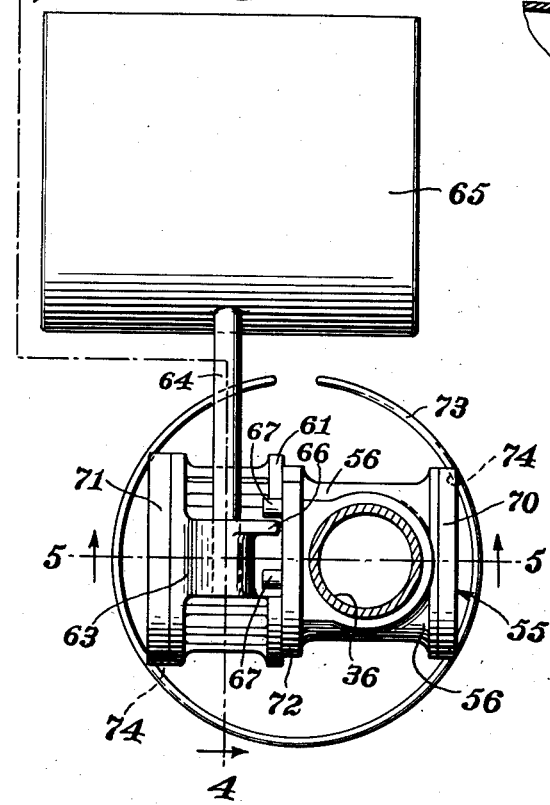
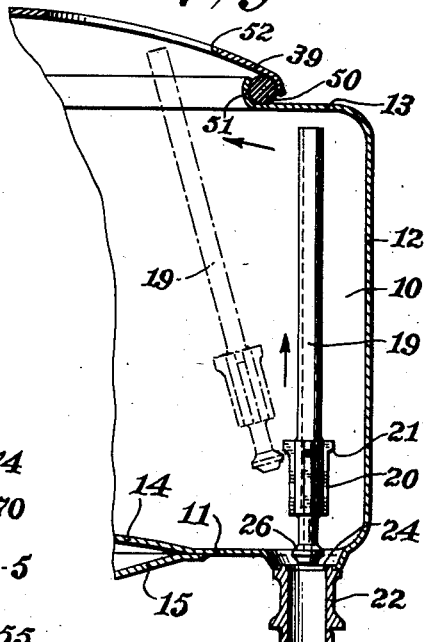
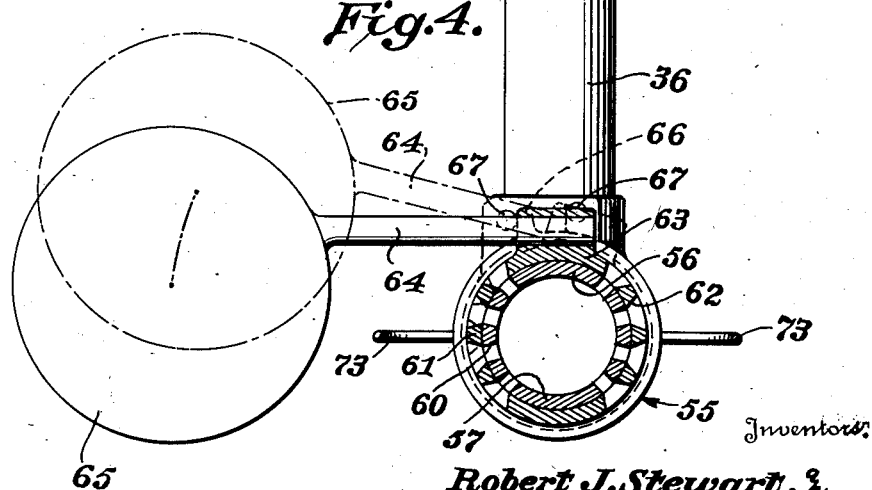
Inventors:
Robert J. Stewart,
Henry H. Franz,
Attorneys.

Patented July 11, 1944

2,353,277

UNITED STATES PATENT OFFICE 2,353,277

FLOAT VALVE FOR FILLING MACHINE RESERVOIRS

Robert J. Stewart and Henry H. Franz, Baltimore, Md., assignors to Crown Cork & Seal Company, Inc., Baltimore, Md., a corporation of New York Application June 29, 1939, Serial No. 281,952

1 Claim. (Cl. 137—104)

The present invention relates to a float valve for filling machine reservoirs, and particularly to structures of this type designed for use on milk filling machines.

It is necessary that all portions of a milk filling machine with which the milk comes in contact be of such design that they can be readily disassembled for the frequent cleaning operations required for such machines. These parts comprise the filling valves, reservoir and milk infeed lines, as well as the valve for controlling the height of the milk in the tank.

The principal object of the present invention is to provide a float valve for a milk filling machine reservoir, including flow lines and a flow control valve, which can readily be disassembled for thorough cleaning.

In order that a milk filling machine reservoir and the flow lines connected thereto may be of optimum simplicity so that all parts will be readily available for disassembly and cleaning, it is desirable to have the flow lines enter the reservoir through the reservoir cover plate. However, the flow lines, which have usually included a pressure line, as well as a milk delivery line, imposed considerable weight upon the cover plate and it was necessary to have the cover plate formed of extremely heavy material in order to support the weight imposed upon its central portion by the flow lines.

The design of the reservoir of the present invention is such that its side walls include overhanging flanges to reduce the area of the cover plate so that the latter need not be of extremely heavy construction, and the invention also contemplates the provision of a hand hole in the cover plate through which all of the filling valves may be inserted or removed. Further, in order that the overhanging flange will not interfere with upward movement of the filling valve parts from their seats in the lower wall, the depth of the reservoir is greater than the length of any filling valve part so that all of these parts may be moved directly upwardly from their seats without contacting with the overhanging flange of the reservoir. By this arrangement, if it becomes necessary to insert or remove a valve part while the flow lines are connected to the cover plate, the operation can be performed without dismantling the flow lines.

Difficulties have also heretofore been encountered in endeavoring to support the reservoir upon its carrying post or shaft and at the same time avoid seams or joints in the lower surface of the reservoir. If the reservoir was supported by a fitting secured to the center of the under surface of its lower wall, the lower wall had to be of heavy material to support the load imposed upon its outer area.

By the construction of the reservoir of the present invention, a substantially horizontal skirt is provided on the lower wall of the reservoir, which skirt is secured to the rotating shaft to leave the lower wall of the reservoir free of seams or joints with which milk may contact. Since the skirt is of large area and joins the lower wall of the reservoir at points spaced from the reservoir center, a heavy load can be supported without the use of heavy metal.

Another object of the present invention is to provide a valve for controlling the inlet flow of milk and which valve can be readily disassembled and all surfaces of which are readily available for cleaning.

Heretofore, it has been regarded as undesirable to use a float operated valve in the reservoir because such valves were difficult to clean.

The flow control valve of the present invention is of the float operated type, but is formed of relatively large parts, with no inaccessible crevices or small apertures and with all of the parts held together by a single snap-on member, rather than by threaded securing means or securing means such as would require the provision of apertures or sockets in the valve mechanism.

Still another object of the invention is to provide an inlet flow control valve for a filling machine reservoir which will move with the reservoir during vertical adjustment of the latter.

Other objects and advantages of the invention will be apparent from the following specification and drawings wherein:

Figure 1 is a vertical sectional view of the reservoir.

Figure 2 is a fragmentary sectional view of the reservoir.

Figure 3 is a horizontal sectional view taken above the float valve of Figure 1 and showing this valve in plan.

Figure 4 is a vertical sectional view on the line 4—4 of Figure 3, and

Figure 5 is a vertical sectional view on the line 5—5 of Figure 3.

The numeral 10 designates the milk reservoir which is of cylindrical form and includes a bottom wall 11, side or peripheral wall 12 and an inwardly extending top flange 13. The bottom wall 11 is slightly convex at its central portion as indicated at 14 and a skirt 15 extends inwardly beneath this portion to bear upon the flange 16 of a supporting shaft 17. The shaft 17 is rotated in the usual manner to cause the reservoir 10 to rotate with bottles positioned beneath the filling valves 18 provided in the lower wall 11.

The filling valves 18 are of the construction described in our application for Filling structure, Serial No. 215,680, filed June 24, 1938, and each valve includes an air venting tube 19 provided with longitudinally extending ribs 20 (Figure 2) about its lower portion and which ribs are shouldered as indicated at 21. These shouldered ribs center and support the venting tube 19 in a shell 22 projecting downwardly from the valve aperture 24 provided in the lower wall of the reservoir. As described in our said filling structure application, a resilient valve or sealing ring 25 is adapted to be secured to the lower end of each shell 18 to cooperate with the seating surface 26 on each tube 19 to form a valve which will be opened when the mouth of the bottle to be filled forces the lower portion of the valve ring 25 upwardly from the seating surface 26 as illustrated in Figure 1.

The reservoir 10 is illustrated used in a filling system wherein a low pressure condition is maintained above the surface of the milk in the reservoir so that air will be drawn from the bottles to be filled through the tube 19, with the result that milk will flow more readily into the bottles and dripping of milk from the filling valves will be prevented. As indicated by the dotted line in Figure 1, the level of the milk is maintained below the upper ends of the vent tubes 19.

Milk is delivered to the reservoir 10 through a line 30 which extends to a supply tank, not shown. Line 30 is secured to a T-fitting 31 which has a tube 32 extending downwardly therefrom. The third opening in the T-fitting is closed by a disc 33 held in place with a ring nut 34. Since the line 30 is secured to the milk supply tank this line and the tube 32 will be stationary, that is, will be held against rotation during the rotation of the reservoir 10.

Tube 32 has a sliding fit with a second and liquid inlet tube 36 which is supported in an inlet boss 37 riveted or otherwise secured as indicated at 38 to the edge of a central aperture in the cover 39 of the reservoir. The boss 37 is of greater diameter than the tube 36 so that the latter will be spaced inwardly from the side walls of the boss as shown in Figure 1. Tube 36 is secured in a central aperture in the top wall of boss 37, preferably by welding. A large and readily removable gland nut 40 is threaded to the extreme upper portion of boss 37 to clamp packing rings against the inlet tube 32 and maintain a sealed joint at this point. It will be observed that tube 32 and tube 36 have a sliding fit with respect to each other so that the height of the reservoir may be varied. Also, the lower tube 36 will rotate with boss 37 and the reservoir 10 about the upper and non-rotatable tube 32.

The side walls of boss 37 are apertured as indicated at 41 and a casing 42 surrounds the exterior side portion of boss 37. Casing 42 includes an annular chamber 43 to which the apertures 41 in the boss open, and casing 42 has a line 44 extending therefrom to a vacuum pump, not shown, so that a low pressure condition may be maintained in the upper portion of the reservoir 10. Casing 42 will of course be held against rotation by its connection to the line 44, and the upper and lower inner edges of the casing 42 have a ground or seat fit upon the outer side surfaces of the boss 37 so as to maintain a tight but journalled fit between casing 42 and boss 37.

The low pressure line 44 may have a flexible connection therein to permit this line to move upwardly or downwardly with the reservoir 10 when the latter is adjusted for bottles of different heights.

The reservoir cover 39 has its outer edge turned slightly downwardly to bear upon and partially surround a rubber sealing ring 50 which extends about an upturned flange 51 which defines the central top opening of the reservoir 10. This construction insures that an air-tight seal will be provided between the reservoir cover 39 and the reservoir 10. The reservoir cover 39 has one or more hand holes 52 provided therein and adapted to be closed by cover plates 53 which are provided with sealing rings adapted to bear upon the cover plate so that an air tight seal will also be maintained at this point.

As indicated in Figures 1 and 2, it will be observed that the reservoir 10 is of slightly greater depth than the length of the venting tubes 19 so that when the sealing or valve ring 25 associated with a vent tube 19 has been removed, that vent tube may be drawn upwardly to the solid line position shown in Figure 2 and then moved outwardly through the hand hole 52 through the dotted line position indicated in Figure 2. This arrangement is of considerable importance in machines of this type since it enables all of the vent tubes to be withdrawn from the reservoir during cleaning of the machine simply by rotating the cover plate upon the reservoir to bring the hand hole 52 successively adjacent the various vent tubes. In other words, it is not necessary that the milk supply line 30 and the low pressure line 44 be disconnected and the cover plate 39 removed in order to permit insertion or removal of the vent tubes 19.

The flow of milk into the reservoir 10 through supply line 30 and the vertical tubes 32 and 36 is regulated by a float valve 55 mounted upon a cylindrical casing 56 which includes a horizontal bore 57 opening to a vertical sleeve 58 which is suitably secured, for example by a weld, to the lower end of tube 36. The casing 56 extends laterally of tube 36 as shown in Figures 1 and 5 and the extended portion has a series of slots 60 spaced about the same. A rotatable valve sleeve 61 seats on the slotted extended portion and has slots 62 provided therein.

As shown in Figure 4, the two series of slots do not necessarily extend entirely about the two cylindrical elements but may be provided only in two opposite portions of the latter. The sleeve valve 61 has a boss 63 in its upper portion from which a rod 64 extends to support a float 65. A shoulder 66 is formed on the boss 63 to limit the turning movement of sleeve valve 61 by contact with a pair of spaced pins 67 which project from the upper portion 58 of casing 56.

The ends of the horizontal bore of the cylindrical casing 56 are closed by discs or plates 70 and 71 which fit into and extend past the edge of the horizontal bore as best shown in Figure 5. The plate 71 in the laterally extended portion of casing 56 is of sufficiently large diameter to hold the sleeve valve 61 in proper position upon the casing, that is, against a shoulder 72 extending about the exterior of the casing. The two end plates 70 and 71 are held in assembled relation, thereby also holding the sleeve valve in proper position, by means of a metal C-shaped clamp 73 which extends about the casing 56 as shown in Figures 3 and 4 and fits into notches 74 in the outer edges of the end plates 70 and 71. Clamp 73 is resilient.

It will be observed that by the construction described above, the float control valve can readily be taken apart for cleaning and that its design is such that when it is disassembled, every part thereof will be easily accessible to washing fluid. The reservoir 10 and the fittings through which milk is delivered thereto and by means of which a low pressure condition is maintained in the reservoir can also be quickly disassembled and will then be available for thorough cleaning.

Since the float valve is movable with lower tube 36, which is fixed with respect to boss 37 and the reservoir 10, the float valve will rotate with the reservoir and will also move vertically with the latter. The fact that the float valve moves vertically with the reservoir is particularly advantageous in that it eliminates the necessity of re-setting the level of the valve when the reservoir is moved to handle bottles of different sizes.

While the invention has been described in connection with a machine of the type described in our prior application, that is, a low-pressure reservoir milk filling machine, it will be appreciated that the features of the present invention can be used upon various types of milk filling machines, as well as upon machines for handling fluids other than milk.

It will be understood that the terminology used in the specification is for the purpose of description and not of limitation, the scope of the invention being indicated in the claim.

We claim:

An inlet valve for filling machines comprising an open-ended cylindrical casing adapted to be secured to a liquid supply tube, said casing having a plurality of flow apertures spaced about its periphery, an apertured sleeve valve rotatable upon the apertured portion of said casing, a float secured to said valve, removable end plates to close the ends of said casing and maintain said valve in position on the latter, and resilient means to hold said end plates in position on said casing.

ROBERT J. STEWART.
HENRY H. FRANZ.